United States Patent
Sebire et al.

(10) Patent No.: US 12,445,896 B2
(45) Date of Patent: Oct. 14, 2025

(54) CONTROL OF DATA RATE BOOSTS IN RADIO ACCESS NETWORKS

(71) Applicant: NOKIA SOLUTIONS AND NETWORKS OY, Espoo (FI)

(72) Inventors: Benoist Pierre Sebire, Tokyo (JP); Matti Laitila, Oulu (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 334 days.

(21) Appl. No.: 17/799,861

(22) PCT Filed: Feb. 14, 2020

(86) PCT No.: PCT/EP2020/053917
§ 371 (c)(1),
(2) Date: Aug. 15, 2022

(87) PCT Pub. No.: WO2021/160286
PCT Pub. Date: Aug. 19, 2021

(65) Prior Publication Data
US 2023/0075436 A1    Mar. 9, 2023

(51) Int. Cl.
*H04W 28/02* (2009.01)
*H04W 28/10* (2009.01)

(52) U.S. Cl.
CPC ... *H04W 28/0268* (2013.01); *H04W 28/0278* (2013.01); *H04W 28/10* (2013.01)

(58) Field of Classification Search
CPC ......... H04W 28/0268; H04W 28/0278; H04W 28/10; H04W 72/21; H04W 28/22
USPC ........................................................ 370/329
See application file for complete search history.

(56) References Cited

U.S. PATENT DOCUMENTS

| | | | | |
|---|---|---|---|---|
| 2003/0219037 A1* | 11/2003 | Toskala | ............... | H04W 28/22 370/328 |
| 2007/0032200 A1* | 2/2007 | Taneja | ............... | H04L 1/0018 455/70 |
| 2013/0308475 A1* | 11/2013 | Celebi | ............... | H04W 72/542 370/252 |
| 2016/0057800 A1* | 2/2016 | Ingale | ............... | H04L 5/0032 370/216 |
| 2017/0280474 A1* | 9/2017 | Vesterinen | ............ | H04W 28/22 |
| 2017/0374579 A1* | 12/2017 | Wang | ............... | H04W 28/0278 |
| 2018/0054288 A1* | 2/2018 | Gelabert | ............... | H04L 5/0048 |
| 2019/0297536 A1* | 9/2019 | Kang | ............... | H04W 80/02 |

(Continued)

FOREIGN PATENT DOCUMENTS

| WO | WO 2008/055239 | * | 5/2008 |
| WO | WO 2019/133049 | * | 7/2019 |

OTHER PUBLICATIONS

Qualcomm Incorporated: "Feasibility of Downlink and Uplink Assistance in 5GMS", 3GPPDRAFT, Oct. 19, 2019.*

(Continued)

*Primary Examiner* — Jungwon Chang
(74) *Attorney, Agent, or Firm* — Lippes Mathias LLP (57) ABSTRACT

There are provided measures for control of data rate boosts in radio access networks. Such measures exemplarily comprise, at an access node in a mobile network, receiving (S51), from a core network entity in said mobile network, an indication in relation to a data rate boost with respect to an uplink flow of a terminal, and preparing (S52) said data rate boost based on said indication.

11 Claims, 8 Drawing Sheets

---

S71: receiving information from an access node in a mobile network providing access for said terminal, said information being indicative of that said terminal is allowed to request establishing a data rate boost with respect to an uplink flow of said terminal S72: deciding to request establishment of said data rate boost S73: transmitting, to said access node, a request for establishing said data rate boost (56) References Cited

U.S. PATENT DOCUMENTS

2020/0178278 A1* 6/2020 Zhao .................... H04W 72/21
2022/0408423 A1* 12/2022 Ljung .................. H04W 72/20

OTHER PUBLICATIONS

International Search Report and Written Opinion dated Oct. 8, 2020 corresponding to International Patent Application No. PCT/EP2020/053917.

Qualcomm Incorporated, "Feasibility of Downlink and Uplink Assistance in 5GMS," 3GPP Draft; S4-191202, 3GPP TSG-SA4#106, Busan, Korea, Oct. 21-25, 2019, Oct. 19, 2019, XP051797611.

Qualcomm Incorporated, "RAN Signaling based Uplink Assistance in 5GMSA," 3GPP Draft; S4-190371, 3GPP TSG-SA Meeting #103, Newport Beach, CA, USA, Apr. 8-12, 2019, Apr. 2, 2019, XP051721966.

Qualcomm Incorporated, "Uplink Assistance via RAN Signaling," 3GPP Draft; S4-191194, 3GPP TSG-SA4 WG4 Meeting #106, Busan, Korea, Oct. 21-25, 2019, Oct. 15, 2019, XP051799474.

SA WG4: "LS on PDU session modification feature in TS 23.502 Procedures for the 5G System (5GS); Stage 2," 3GPP Draft; S4-191331, 3GPP TS WG4 Meeting 106, Busan, South Korea, Oct. 21-25, 2019, Oct. 25, 2019, XP051797752.

* cited by examiner

CONTROL OF DATA RATE BOOSTS IN RADIO ACCESS NETWORKS

FIELD

The present invention relates to control of data rate boosts in radio access networks. More specifically, the present invention exemplarily relates to measures (including methods, apparatuses and computer program products) for realizing control of data rate boosts in radio access networks.

BACKGROUND

The present specification generally relates to temporary boosts in a delivery data rate in an uplink flow of a terminal.

According to the Third Generation Partnership Project (3GPP) (S4-191331, 3GPP TSG SA WG4), a feature is foreseen that enables an application function (AF), on behalf of a terminal, e.g. a user equipment (UE), to request a temporary boost in delivery data rate, e.g. to temporarily elevate the quality of service (QoS) level of a QoS flow. Here, the use of procedures to modify a packet data unit (PDU) session is envisioned, specifically via the Npcf_PolicyAuthorization service and the Nnef_AFSessionWithQoS service.

The only policy control function (PCF) procedure that can be used at non-access stratum (NAS) level is the PDU session modification procedure, and a trusted AF may use the procedure Npcf_PolicyAuthorization service (according to mobile network operator (MNO) policy) to trigger the PCF to dynamically modify QoS flows.

However, although 3GPP has not specified any performance requirements, any restrictions, or scalability requirements for the PDU session modification or AF session with required QoS procedures (Npcf_PolicyAuthorization and Nnef_AFSessionWithQoS), a NAS level procedure is too heavy in terms of signaling load and the resulting latency times, especially for the uplink.

Hence, the problem arises that a technique to implement a temporary boost in delivery data rate avoiding the NAS level approach described above is not known. In other words, the problem arises that a technique to implement a temporary boost in delivery data rate with an approach less invasive than the NAS level approach described above is not known.

Hence, there is a need to provide for control of data rate boosts in radio access networks. There may in particular be a need for introducing mechanisms where, after the initial configuration to RAN and UE, a temporary data rate boost is controlled purely between the UE and Access Nodes of the RAN, for avoiding time consuming and resource consuming end to end signalling between UE and CN, i.e. for avoiding signaling between RAN and CN and CN internal signaling. There may also be a need for mechanisms for activating a temporary data rate boost by the core network with low control signaling effort.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method of an access node in a mobile network, comprising receiving, from a core network entity in said mobile network, an indication in relation to a data rate boost with respect to an uplink flow of a terminal, wherein a packet data unit session corresponding to said uplink flow is not modified, and preparing said data rate boost based on said indication.

According to an exemplary aspect of the present invention, there is provided a method of a core network entity in a mobile network, comprising deciding on a data rate boost with respect to an uplink flow of a terminal, and transmitting, to an access node in said mobile network providing access for said terminal, an indication in relation to said data rate boost, wherein a packet data unit session corresponding to said uplink flow is not modified.

According to an exemplary aspect of the present invention, there is provided a method of a terminal, comprising receiving information from an access node in a mobile network providing access for said terminal, said information being indicative of that said terminal is allowed to request establishing a data rate boost with respect to an uplink flow of said terminal, deciding to request establishment of said data rate boost, and transmitting, to said access node, a request for establishing said data rate boost, wherein a packet data unit session corresponding to said uplink flow is not modified.

According to an exemplary aspect of the present invention, there is provided an apparatus at an access node in a mobile network, the apparatus comprising receiving circuitry configured to receive, from a core network entity in said mobile network, an indication in relation to a data rate boost with respect to an uplink flow of a terminal, wherein a packet data unit session corresponding to said uplink flow is not modified, and preparing circuitry configured to prepare said data rate boost based on said indication.

According to an exemplary aspect of the present invention, there is provided an apparatus at a core network entity in a mobile network, the apparatus comprising deciding circuitry configured to decide on a data rate boost with respect to an uplink flow of a terminal, and transmitting circuitry configured to transmit, to an access node in said mobile network providing access for said terminal, an indication in relation to said data rate boost, wherein a packet data unit session corresponding to said uplink flow is not modified.

According to an exemplary aspect of the present invention, there is provided an apparatus at a terminal, the apparatus comprising receiving circuitry configured to receive information from an access node in a mobile network providing access for said terminal, said information being indicative of that said terminal is allowed to request establishing a data rate boost with respect to an uplink flow of said terminal, deciding circuitry configured to decide to request establishment of said data rate boost, and transmitting circuitry configured to transmit, to said access node, a request for establishing said data rate boost, wherein a packet data unit session corresponding to said uplink flow is not modified.

According to an exemplary aspect of the present invention, there is provided an apparatus at an access node in a mobile network, the apparatus comprising at least one processor, at least one memory including computer program code, and at least one interface configured for communication with at least another apparatus, the at least one processor, with the at least one memory and the computer program code, being configured to cause the apparatus to perform receiving, from a core network entity in said mobile network, an indication in relation to a data rate boost with respect to an uplink flow of a terminal, wherein a packet data unit session corresponding to said uplink flow is not modified, and preparing said data rate boost based on said indication.

According to an exemplary aspect of the present invention, there is provided an apparatus at an access node in a mobile network, the apparatus comprising at least one processor, at least one memory including computer program code, and at least one interface configured for communication with at least another apparatus, the at least one processor, with the at least one memory and the computer program code, being configured to cause the apparatus to perform deciding on a data rate boost with respect to an uplink flow of a terminal, and transmitting, to an access node in said mobile network providing access for said terminal, an indication in relation to said data rate boost, wherein a packet data unit session corresponding to said uplink flow is not modified.

According to an exemplary aspect of the present invention, there is provided an apparatus at an access node in a mobile network, the apparatus comprising at least one processor, at least one memory including computer program code, and at least one interface configured for communication with at least another apparatus, the at least one processor, with the at least one memory and the computer program code, being configured to cause the apparatus to perform receiving information from an access node in a mobile network providing access for said terminal, said information being indicative of that said terminal is allowed to request establishing a data rate boost with respect to an uplink flow of said terminal, deciding to request establishment of said data rate boost, and transmitting, to said access node, a request for establishing said data rate boost, wherein a packet data unit session corresponding to said uplink flow is not modified.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient initiation of a temporary boost in delivery data rate to thereby solve at least part of the problems and drawbacks identified in relation to the prior art.

By way of exemplary embodiments of the present invention, there is provided control of data rate boosts in radio access networks. More specifically, by way of exemplary embodiments of the present invention, there are provided measures and mechanisms for realizing control of data rate boosts in radio access networks.

Thus, improvement is achieved by methods, apparatuses and computer program products enabling/realizing control of data rate boosts in radio access networks.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) control of data rate boosts in radio access networks.

Figure 1:
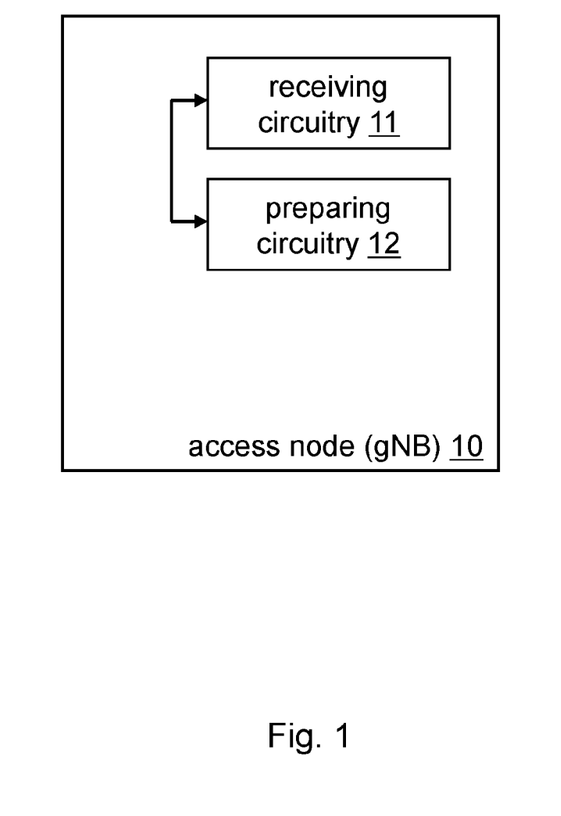
FIG. 1 is a block diagram illustrating an apparatus according to exemplary embodiments of the present invention.
Figure 5:
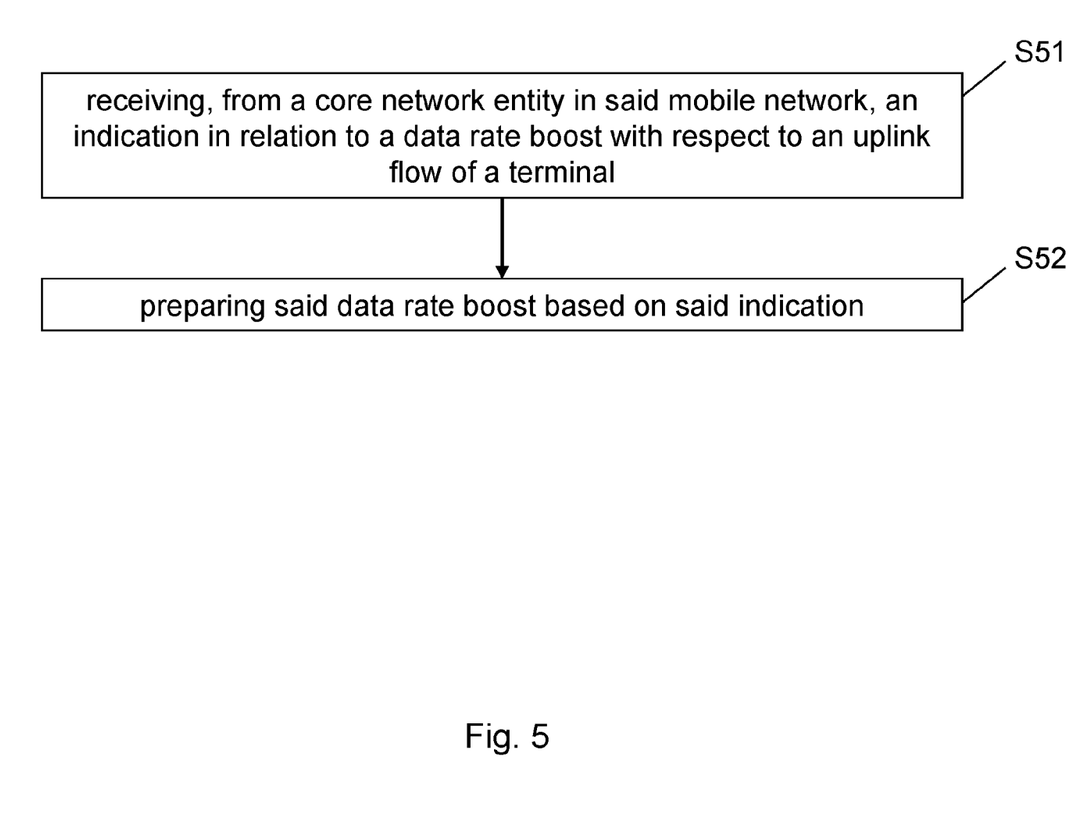
FIG. 5 is a schematic diagram of a procedure according to exemplary embodiments of the present invention.

FIG. 1 is a block diagram illustrating an apparatus according to exemplary embodiments of the present invention. The apparatus may be an access node 10 such as a base station comprising a receiving circuitry 11 and a preparing circuitry 12. The receiving circuitry 11 receives, from a core network entity in said mobile network, an indication in relation to a data rate boost with respect to an uplink flow of a terminal. The indication may be such that a packet data unit session corresponding to said uplink flow is not modified. In particular, in such case a foreseen PDU session modification procedure is not used. In other words, the indication may be an explicit indication, which means that the PDU session modification procedure is not used but only a bit rate boost is indicated. The preparing circuitry 12 prepares said data rate boost based on said indication. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51), from a core network entity in said mobile network, an indication in relation to a data rate boost with respect to an uplink flow of a terminal, and an operation of preparing (S52) said data rate boost based on said indication. The indication may be such that a packet data unit session corresponding to said uplink flow is not modified. In particular, in such case a foreseen PDU session modification procedure is not used. In other words, the indication may be an explicit indication, which means that the PDU session modification procedure is not used but only a bit rate boost is indicated.

Figure 2:
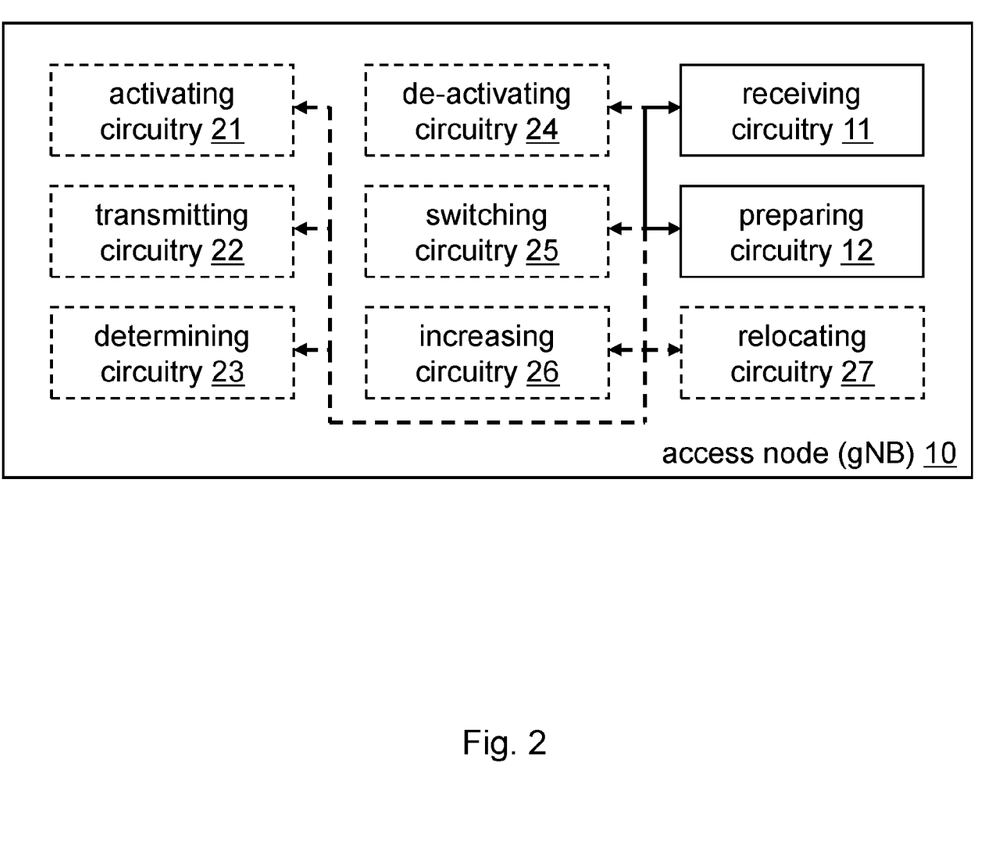
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise activating circuitry 21, transmitting circuitry 22, determining circuitry 23, de-activating circuitry 24, switching circuitry 25, increasing circuitry 26, and/or relocating circuitry 27.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, said indication is indicative of that said data rate boost is to be established, and exemplary details of the preparing operation (S52) are given, which are inherently independent from each other as such.

Such exemplary preparing operation (S52) according to exemplary embodiments of the present invention may comprise an operation of activating said data rate boost based on said indication.

According to a variation of the procedure shown in FIG. 5, said indication is indicative of that said data rate boost is to be allowed, and exemplary details of the preparing operation (S52) are given, which are inherently independent from each other as such.

Such exemplary preparing operation (S52) according to exemplary embodiments of the present invention may comprise an operation of transmitting information to said terminal, said information being indicative of that said terminal is allowed to request establishing said data rate boost.

According to a variation of the procedure shown in FIG. 5, exemplary details of the preparing operation (S52) and exemplary additional operations are given, which are inherently independent from each other as such.

According to such variation, an exemplary method according to exemplary embodiments of the present invention may comprise an operation of receiving, from said terminal, a request for establishing said data rate boost.

Further, such exemplary preparing operation (S52) according to exemplary embodiments of the present invention may comprise an operation of receiving, from said terminal, a request for establishing said data rate boost.

According to a variation of the procedure shown in FIG. 5, exemplary additional operations are given, which are inherently independent from each other as such. According to such variation, an exemplary method according to exemplary embodiments of the present invention may comprise an operation of determining whether a data rate boost timer is expired since activating said data rate boost, and an operation of de-activating, if said data rate boost timer is determined to be expired, said data rate boost.

According to exemplary embodiments of the present invention, said data rate boost timer is pre-configured.

Alternatively, according to exemplary embodiments of the present invention, said indication is indicative of said data rate boost timer.

According to a variation of the procedure shown in FIG. 5, exemplary additional operations are given, which are inherently independent from each other as such. According to such variation, an exemplary method according to exemplary embodiments of the present invention may comprise an operation of receiving an instruction to de-activate said data rate boost, and an operation of de-activating said data rate boost based on said instruction.

According to a variation of the procedure shown in FIG. 5, said request is indicative of a data rate boost timer, and exemplary additional operations are given, which are inherently independent from each other as such. According to such variation, an exemplary method according to exemplary embodiments of the present invention may comprise an operation of determining whether said data rate boost timer is expired since activating said data rate boost, and an operation of de-activating, if said data rate boost timer is determined to be expired, said data rate boost.

According to exemplary embodiments of the present invention, said request is received as a radio resource control signaling to signal said uplink flow and/or a protocol data unit session for which said data rate boost is requested.

Alternatively, according to exemplary embodiments of the present invention, said request is received as a service data adaptation protocol control protocol data unit.

Alternatively, according to exemplary embodiments of the present invention, said request is received as a medium access control element to signal said uplink flow and/or a protocol data unit session for which said data rate boost is requested.

Alternatively, according to exemplary embodiments of the present invention, said request is received as a valid code point in a buffer status of a logical channel group containing a logical channel carrying said uplink flow for which said data rate boost is requested.

Alternatively, according to exemplary embodiments of the present invention, said request is received as a scheduling request configuration or a random access channel configuration.

According to a variation of the procedure shown in FIG. 5, exemplary details of the activating operation are given, which are inherently independent from each other as such.

Such exemplary activating operation according to exemplary embodiments of the present invention may comprise an operation of switching said uplink flow to a preconfigured quality of service profile supporting a higher data rate than a preconfigured standard quality of service profile.

Alternatively, such exemplary activating operation according to exemplary embodiments of the present invention may comprise an operation of increasing a priority of a logical channel carrying said uplink flow.

Alternatively, such exemplary activating operation according to exemplary embodiments of the present invention may comprise an operation of transmitting said indication to a second access node in said mobile network forming a split bearer arrangement with said access node.

Alternatively, such exemplary activating operation according to exemplary embodiments of the present invention may comprise an operation of relocating said uplink flow to a dedicated radio bearer providing higher data rate than a current dedicated radio bearer.

Alternatively, or in addition, such exemplary activating operation according to exemplary embodiments of the present invention may comprise an operation of transmitting said request to said second access node in said mobile network forming said split bearer arrangement with said access node.

Figure 3:
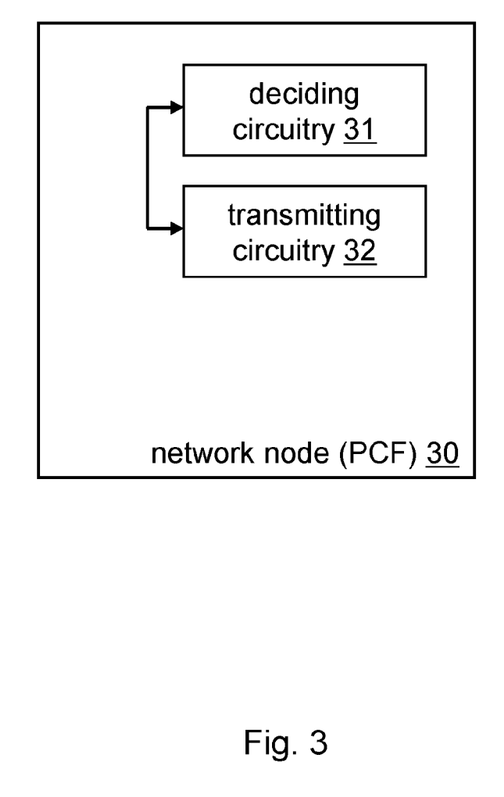
FIG. 3 is a block diagram illustrating an apparatus according to exemplary embodiments of the present invention.
Figure 6:
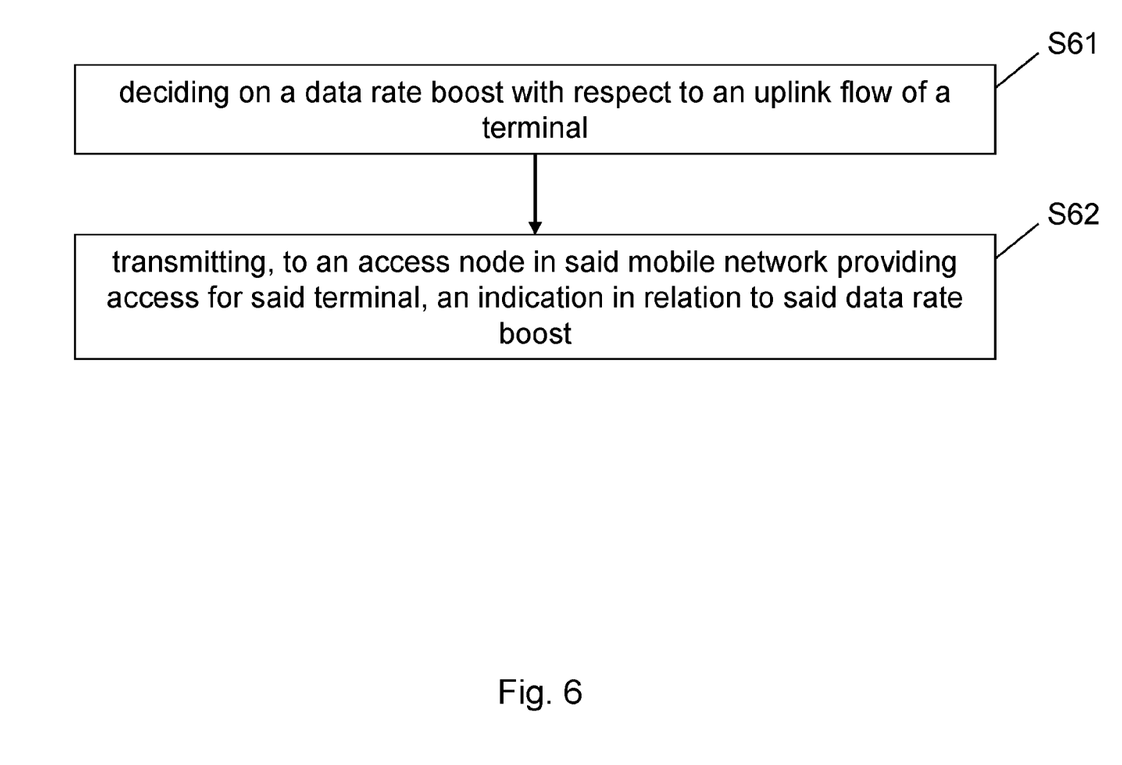
FIG. 6 is a schematic diagram of a procedure according to exemplary embodiments of the present invention.

FIG. 3 is a block diagram illustrating an apparatus according to exemplary embodiments of the present invention. The apparatus may be a network node 30 such as a policy charging function entity comprising a deciding circuitry 31 and a transmitting circuitry 32. The deciding circuitry 31 decides on a data rate boost with respect to an uplink flow of a terminal. The transmitting circuitry 32 transmits, to an access node in said mobile network providing access for said terminal, an indication in relation to said data rate boost. The indication may be such that a packet data unit session corresponding to said uplink flow is not modified. In particular, in such case a foreseen PDU session modification procedure is not used. In other words, the indication may be an explicit indication, which means that the PDU session modification procedure is not used but only a bit rate boost is indicated. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of deciding (S61) on a data rate boost with respect to an uplink flow of a terminal, and an operation of transmitting (S62), to an access node in said mobile network providing access for said terminal, an indication in relation to said data rate boost. The indication may be such that a packet data unit session corresponding to said uplink flow is not modified. In particular, in such case a foreseen PDU session modification procedure is not used. In other words, the indication may be an explicit indication, which means that the PDU session modification procedure is not used but only a bit rate boost is indicated.

According to exemplary embodiments of the present invention, said indication is indicative of that said data rate boost is to be established.

According to exemplary embodiments of the present invention, said indication is indicative of that said data rate boost is to be allowed.

According to exemplary embodiments of the present invention, said indication is indicative of a data rate boost timer upon an expiry of which said data rate boost is to be de-activated.

According to exemplary embodiments of the present invention, said data rate boost is activated by switching said uplink flow to a preconfigured quality of service profile supporting a higher data rate than a preconfigured standard quality of service profile.

Alternatively, according to exemplary embodiments of the present invention, said data rate boost is activated by increasing a priority of a logical channel carrying said uplink flow.

Alternatively, according to exemplary embodiments of the present invention, said data rate boost is activated by transmitting said indication to a second access node in said mobile network forming a split bearer arrangement with said access node.

Alternatively, according to exemplary embodiments of the present invention, said data rate boost is activated by relocating said uplink flow to a dedicated radio bearer providing higher data rate than a current dedicated radio bearer.

Alternatively, or in addition, according to exemplary embodiments of the present invention, said data rate boost is activated by transmitting said request to said second access node in said mobile network forming said split bearer arrangement with said access node.

Figure 4:
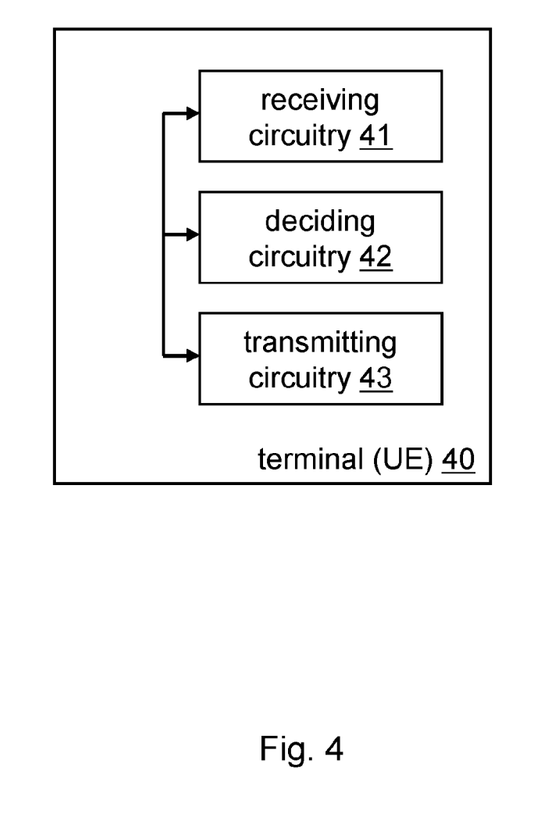
FIG. 4 is a block diagram illustrating an apparatus according to exemplary embodiments of the present invention.
Figure 7:
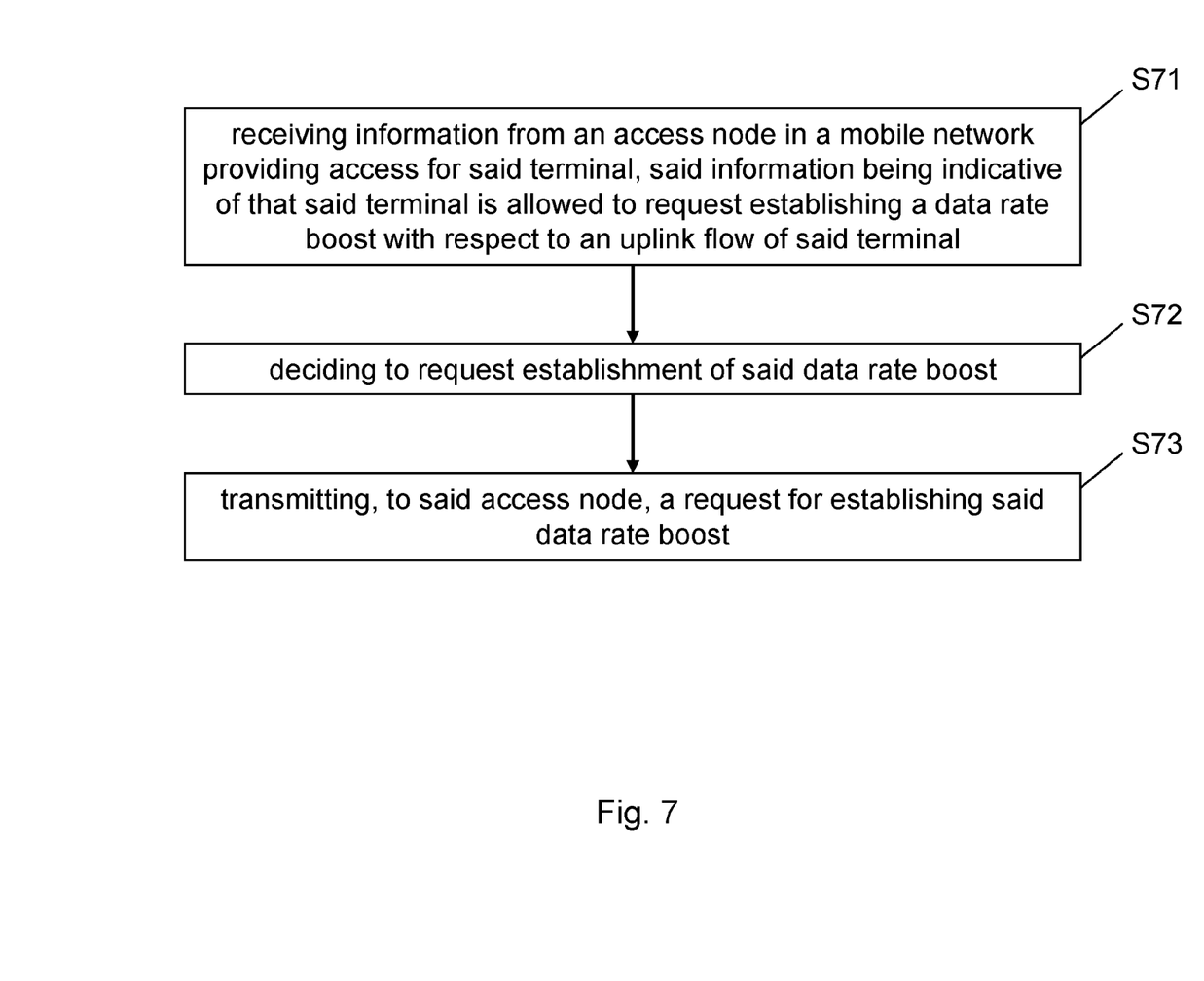
FIG. 7 is a schematic diagram of a procedure according to exemplary embodiments of the present invention.

FIG. 4 is a block diagram illustrating an apparatus according to exemplary embodiments of the present invention. The apparatus may be a terminal 40 such as a user equipment comprising a receiving circuitry 41, a deciding circuitry 42, and a transmitting circuitry 43. The receiving circuitry 41 receives information from an access node in a mobile network providing access for said terminal, said information being indicative of that said terminal is allowed to request establishing a data rate boost with respect to an uplink flow of said terminal. The deciding circuitry 42 decides to request establishment of said data rate boost. The transmitting circuitry 43 transmits, to said access node, a request for establishing said data rate boost. FIG. 7 is a schematic diagram of a procedure according to exemplary embodiments of the present invention. The request may be such that a packet data unit session corresponding to said uplink flow is not modified. In particular, in such case a foreseen PDU session modification procedure is not used. The apparatus according to FIG. 4 may perform the method of FIG. 7 but is not limited to this method. The method of FIG. 7 may be performed by the apparatus of FIG. 4 but is not limited to being performed by this apparatus.

As shown in FIG. 7, a procedure according to exemplary embodiments of the present invention comprises an operation of receiving (S71) information from an access node in a mobile network providing access for said terminal, said information being indicative of that said terminal is allowed to request establishing a data rate boost with respect to an uplink flow of said terminal, an operation of deciding (S72) to request establishment of said data rate boost, and an operation of transmitting (S73), to said access node, a request for establishing said data rate boost. The request may be such that a packet data unit session corresponding to said uplink flow is not modified. In particular, in such case a foreseen PDU session modification procedure is not used.

In an embodiment at least some of the functionalities of the apparatus shown in FIG. 4 may be shared between two physically separate devices forming one operational entity. Therefore, the apparatus may be seen to depict the operational entity comprising one or more physically separate devices for executing at least some of the described processes.

According to exemplary embodiments of the present invention, said request is indicative of a data rate boost timer upon an expiry of which said data rate boost is to be de-activated.

According to exemplary embodiments of the present invention, said request is transmitted as a radio resource control signaling to signal said uplink flow and/or a protocol data unit session for which said data rate boost is requested.

Alternatively, according to exemplary embodiments of the present invention, said request is transmitted as a service data adaptation protocol control protocol data unit.

Alternatively, according to exemplary embodiments of the present invention, said request is transmitted as a medium access control element to signal said uplink flow and/or a protocol data unit session for which said data rate boost is requested.

Alternatively, according to exemplary embodiments of the present invention, said request is transmitted as a valid code point in a buffer status of a logical channel group containing a logical channel carrying said uplink flow for which said data rate boost is requested.

Alternatively, according to exemplary embodiments of the present invention, said request is transmitted as a scheduling request configuration or a random access channel configuration.

According to a variation of the procedure shown in FIG. 7, exemplary additional operations are given, which are inherently independent from each other as such. According to such variation, an exemplary method according to exemplary embodiments of the present invention may comprise an operation of transmitting said request for establishing said data rate boost to a second access node in said mobile network forming a split bearer arrangement with said access node.

According to exemplary embodiments of the present invention, said data rate boost is activated by switching said uplink flow to a preconfigured quality of service profile supporting a higher data rate than a preconfigured standard quality of service profile.

Alternatively, according to exemplary embodiments of the present invention, said data rate boost is activated by increasing a priority of a logical channel carrying said uplink flow.

Alternatively, according to exemplary embodiments of the present invention, said data rate boost is activated by transmitting said indication to a second access node in said mobile network forming a split bearer arrangement with said access node.

Alternatively, according to exemplary embodiments of the present invention, said data rate boost is activated by relocating said uplink flow to a dedicated radio bearer providing higher data rate than a current dedicated radio bearer.

Alternatively, or in addition, according to exemplary embodiments of the present invention, said data rate boost is activated by transmitting said request to said second access node in said mobile network forming said split bearer arrangement with said access node.

In more specific terms, exemplary embodiments of the present invention focus on the uplink (e.g. of a terminal).

As a first main approach of exemplary embodiments of the present invention, the gNB (being an example for an access node in a mobile network) is informed by the core network (CN) (e.g. PCF (being an example for a network node in a mobile network)), that a temporary data rate boost (TDRB) is occurring for one of the uplink (UL) QoS flow(s) of a UE (being an example for a terminal).

According to exemplary embodiments of the present invention, this assumes that once the TDRB is no longer needed, the gNB is also informed. According to exemplary embodiments of the present invention, this could be achieved by a separate signaling, or by starting a timer when the TDRB starts. The value of the timer may be fixed/pre-configured or may be signaled together with the TDRB indication from the CN.

As a second main approach of exemplary embodiments of the present invention, the gNB is first informed by the CN (e.g. PCF), that a TDRB can occur (for instance at PDU session establishment) and the UE is then told whether it can request a TDRB on its own at radio access network (RAN) level. According to exemplary embodiments of the present invention, this can be done at QoS flow level or PDU session level (both for the CN to the gNB signaling and for the gNB to the UE signaling).

A timer for how long the TDRB is assumed can also be part of the configuration. According to exemplary embodiments of the present invention, assuming that the configuration is done on a QoS flow level, when a TDRB occurs for a QoS flow, and the UE is configured to indicate such TDRB, the UE then signals it to the gNB.

According to exemplary embodiments of the present invention, the UE to gNB signaling may be embodied as follows.

On the one hand, such signaling may be embodied as radio resource control (RRC) signaling to signal the QoS flow/PDU/DRB session for which a TDRB occurs.

On the other hand, such signaling may be embodied using a (new) service data adaptation protocol (SDAP) control PDU to signal TDRB for the QoS flow.

On the other hand, such signaling may be embodied introducing a (new) medium access control (MAC) control element (CE) to signal the QoS flow/PDU session for which a TDRB occurs. If only a limited number of QoS flows/PDU sessions can experience TDRB, a bitmap for those QoS flows would reduce the overhead.

On the other hand, such signaling may be embodied using a special code point in the buffer status of the logical channel group (LCG) containing the logical channel (LCH) carrying the QoS flow (that special code point would then have to be made invalid/forbidden when the UE is configured to signal TDRB and a TDRB does not occur).

On the other hand, such signaling may be embodied using a separate scheduling request (SR) configuration (or random access channel (RACH) if SR is not configured). This alternative, however, does not offer much granularity.

With the TDRB signaling from the CN, the gNB knows that a larger buffering indicated by the buffer status reports (BSR) from the UE is due to TDRB and that additional resources needs to be granted—as opposed to letting PDUs to be discarded to reduce the bit rate at the application level.

According to the second main approach of exemplary embodiments of the present invention, similarly as for the CN signaling according to the first main approach of exemplary embodiments of the present invention, it is assumed that once the TDRB no longer occurs, the gNB is also informed. According to exemplary embodiments of the present invention, this could be achieved by a separate signaling, or by starting a timer when the TDRB starts. The value of the timer may be fixed/pre-configured or may be signaled together with the TDRB indication if a MAC CE is used. According to exemplary embodiments of the present invention, if the TDRB still occurs after the timer has expired, the UE would then issue another TDRB indication. Alternatively, according to exemplary embodiments of the present invention, some prohibit mechanism is introduced to prevent the UE from requesting additional.

According to exemplary embodiments of the present invention, the configuration of the TDRB from CN to RAN can be based on the concept of alternative QoS profiles that is being introduced by SA2 for (but not limited to) Vehicle-to-X (V2X) [S2-2001674]. With alternative QoS profiles, two (or more) QoS profiles are configured at PDU session modification or establishment procedure for a QoS flow. To cope with TDRB, one QoS profile providing the standard data rate is configured and labelled as a the preferred QoS profile (as being specified for V2X), and an additional QoS profile supporting higher data rate is configured and labelled as a boost QoS profile for TDRB. Note that instead of explicitly labelling the additional QoS profile as TDRB, according to exemplary embodiments of the present invention, the gNB can determine implicitly that the QoS flow is subject to TDRB from the fact that the preferred QoS profile is not the one supporting the highest data rate.

With the TDRB signaling from the UE, the gNB also knows that a larger buffering indicated by the BSR from the UE is due to TDRB and that additional resources needs to be granted—as opposed to letting PDUs to be discarded to reduce the bit rate at the application level.

According to both the first main approach and the second main approach of exemplary embodiments of the present invention, when TDRB occurs, the logical channel carrying the corresponding QoS flows may be given a higher priority (configured by RRC). This could be linked to the timer discussed above i.e. for as long as the timer is running, a higher priority is given. In case of the first main approach of exemplary embodiments of the present invention, the gNB would trigger this behavior (e.g. via a new downlink (DL) MAC CE), while for the second main approach of exemplary embodiments of the present invention, this could be linked to the uplink TDRB indication and apply for as long as the timer discussed above is running.

If no additional resources can be granted, a higher prioritization would still ensure that the TDRB is somewhat satisfied.

Further, according to both the first main approach and the second main approach of exemplary embodiments of the present invention, for split bearers in dual connectivity (DC) scenarios, both master node (MN) and secondary node (SN) are informed of TDRB. In case of the first main approach of exemplary embodiments of the present invention, the gNB hosting the PDU session would then have to echo the indication to the other gNB via Xn interface. In case of the second main approach of exemplary embodiments of the present invention, the UE would have to signal it to both nodes or rely on the gNB hosting the split bearer to echo the indication to the other gNB.

According thereto, both nodes can schedule resources accordingly.

Further, according to both the first main approach and the second main approach of exemplary embodiments of the present invention, the data rate of the QoS flow can be temporarily boosted also by relocating the QoS flow to a separate dedicated radio bearer (DRB) providing higher data rate. In this case, RAN can configure, for example at the PDU session modification/establishment, two DRBs for a QoS flow subject to TDRB—one supporting standard data rate and another one supporting boosted data rate. When TDBR occurs for a QoS flow, UE can remap QoS flow from the DRB providing standard data rate to the boost DRB. The gNB can determine the start of the TDRB by observing the UL traffic from the boost DRB and it can accordingly remap QoS flow to the boost DRB also in the DL direction. The UE can relocate QoS flow back to the DRB providing the standard service based on a preconfigured timer, indication from the application layer or status of the transmission buffers. RAN can also initiate the QoS flow relocation back to the DRB providing standard service based by suitable signaling (RRC for example) or by reflective QoS, which enables RAN to watch that UE uses the boost DRB only within the configured limits.

According thereto, relocation of the QoS flow experiencing TDRB allows different LCP parameters to be used.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
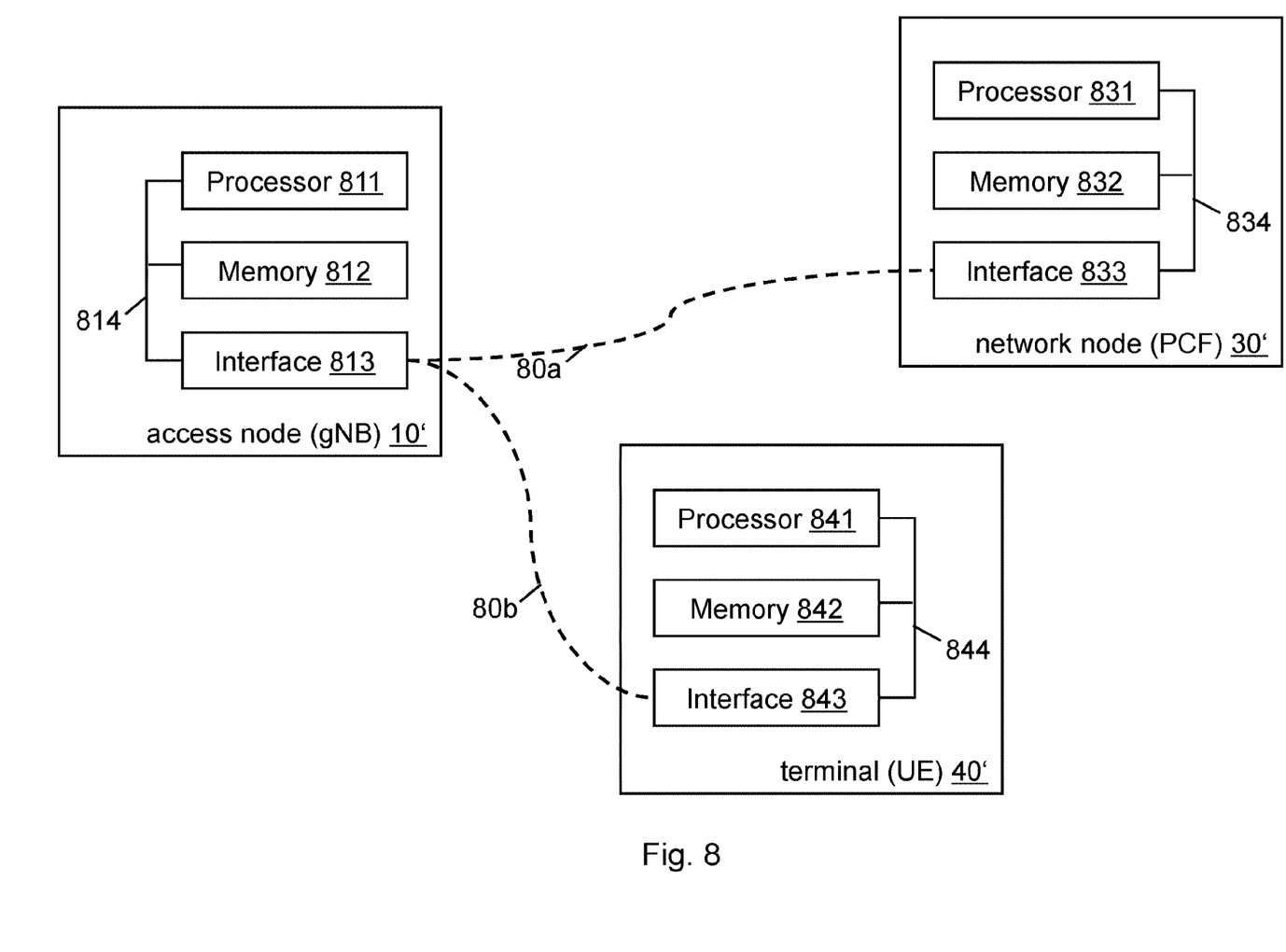
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (access node) 10' (corresponding to the access node 10) comprises a processor 811, a memory 812 and an interface 813, which are connected by a bus 814 or the like. Further, according to exemplary embodiments of the present invention, the apparatus (network node) 30' (corresponding to the network node 30) comprises a processor 831, a memory 832 and an interface 833, which are connected by a bus 834 or the like. Further, according to exemplary embodiments of the present invention, the apparatus (terminal) 40' (corresponding to the terminal 40) comprises a processor 841, a memory 842 and an interface 843, which are connected by a bus 844 or the like, and the apparatuses may be connected via links 80a, 80b, respectively.

The processor 811/831/841 and/or the interface 813/833/843 may also include a modem or the like to facilitate communication over a (hardwire or wireless) link, respectively. The interface 813/833/843 may include a suitable transceiver coupled to one or more antennas or communication means for (hardwire or wireless) communications with the linked or connected device(s), respectively. The interface 813/833/843 is generally configured to communicate with at least one other apparatus, i.e. the interface thereof.

The memory 812/832/842 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the access node 10 comprises at least one processor 811, at least one memory 812 including computer program code, and at least one interface 813 configured for communication with at least another apparatus. The processor (i.e. the at least one processor 811, with the at least one memory 812 and the computer program code) is configured to perform receiving, from a core network entity in said mobile network, an indication in relation to a data rate boost with respect to an uplink flow of a terminal (thus the apparatus comprising corresponding means for receiving), and to perform preparing said data rate boost based on said indication (thus the apparatus comprising corresponding means for preparing).

According to further exemplary embodiments of the present invention, an apparatus representing the network node 30 comprises at least one processor 831, at least one memory 832 including computer program code, and at least one interface 833 configured for communication with at least another apparatus. The processor (i.e. the at least one processor 831, with the at least one memory 832 and the computer program code) is configured to perform deciding on a data rate boost with respect to an uplink flow of a terminal (thus the apparatus comprising corresponding means for deciding), and to perform transmitting, to an access node in said mobile network providing access for said terminal, an indication in relation to said data rate boost (thus the apparatus comprising corresponding means for transmitting).

According to exemplary embodiments of the present invention, an apparatus representing the terminal 40 comprises at least one processor 841, at least one memory 842 including computer program code, and at least one interface 843 configured for communication with at least another apparatus. The processor (i.e. the at least one processor 841, with the at least one memory 842 and the computer program code) is configured to perform receiving information from an access node in a mobile network providing access for said terminal, said information being indicative of that said terminal is allowed to request establishing a data rate boost with respect to an uplink flow of said terminal (thus the apparatus comprising corresponding means for receiving), to perform deciding to request establishment of said data rate boost (thus the apparatus comprising corresponding means for deciding), and to perform transmitting, to said access node, a request for establishing said data rate boost (thus the apparatus comprising corresponding means for transmitting).

For further details regarding the operability/functionality of the individual apparatuses, reference is made to the above description in connection with any one of FIGS. 1 to 7, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for control of data rate boosts in radio access networks. Such measures exemplarily comprise, at an access node in a mobile network, receiving, from a core network entity in said mobile network, an indication in relation to a data rate boost with respect to an uplink flow of a terminal, and preparing said data rate boost based on said indication.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
AF application function
BSR buffer status reports
CE control element
CN core network
DC dual connectivity
DL downlink
DRB dedicated radio bearer
LCG logical channel group
LCH logical channel
LCP logical channel prioritization
MAC medium access control
MN master node
MNO mobile network operator
NAS non-access stratum
PCF policy control function
PDU packet data unit
QoS quality of service
RACH random access channel
RAN radio access network
RRC radio resource control
SDAP service data adaptation protocol
SN secondary node
SR scheduling request
TDRB temporary data rate boost
UE user equipment
UL uplink
V2X Vehicle-to-X

The invention claimed is:

1. A method comprising:
receiving information from an access node in a mobile network providing access for a terminal, said information being indicative of that said terminal is allowed to request establishing a data rate boost with respect to an uplink flow of said terminal;
deciding to request establishment of said data rate boost; and
transmitting, to said access node, a request for establishing said data rate boost, wherein a packet data unit session corresponding to said uplink flow is not modified,
wherein said request is transmitted as a valid code point in a buffer status of a logical channel group containing a logical channel carrying said uplink flow for which said data rate boost is requested,
wherein said data rate is activated by relocating said uplink flow to a dedicated radio bearer providing higher data rate than a current dedicated radio bearer,
wherein said request is indicative of a data rate boost timer upon an expiry of which said data rate boost is to be de-activated, wherein the timer for how long the data rate boost is assumed is part of a configuration of the terminal on a quality of service flow level, and when a data boost occurs for a quality of service flow, the terminal is configured to indicate the data rate boost and signals it to access node,
wherein signaling from the terminal to the access node comprises a special code point in a buffer status of the logical channel group containing the logical channel carrying the quality of service flow, wherein the special code point is made invalid/forbidden when the terminal is configured to signal a data rate boost and a data rate boost does not occur.

2. The method according to claim 1, further comprising transmitting said request for establishing said data rate boost to a second access node in said mobile network forming a split bearer arrangement with said access node.

3. The method according to claim 2, wherein said data rate boost is activated by
transmitting said request to said second access node in said mobile network forming said split bearer arrangement with said access node.

4. A computer program embodied on a non-transitory computer-readable medium, said computer program comprising computer-executable computer program code which, when the program is run on a computer, is configured to cause the computer to carry out the method according to claim 1.

5. The computer program according to claim 4, wherein the program is directly loadable into an internal memory of the computer or a processor thereof.

6. An apparatus comprising:
receiving circuitry configured to receive information from an access node in a mobile network providing access for a terminal, said information being indicative of that said terminal is allowed to request establishing a data rate boost with respect to an uplink flow of said terminal;
deciding circuitry configured to decide to request establishment of said data rate boost; and
transmitting circuitry configured to transmit, to said access node, a request for establishing said data rate boost, wherein a packet data unit session corresponding to said uplink flow is not modified, wherein said transmitting circuitry is configured to transmit said request as a valid code point in a buffer status of a logical channel group containing a logical channel carrying said uplink flow for which said data rate boost is requested, wherein said data rate boost is activated by relocating said uplink flow to a dedicated radio bearer providing higher data rate than a current dedicated radio bearer, wherein said request is indicative of a data rate boost timer upon an expiry of which said data rate boost is to be de-activated, wherein the timer for how long the data rate boost is assumed is part of a configuration of the terminal on a quality of service flow level, and when a data boost occurs for a quality of service flow, the terminal is configured to indicate the data rate boost and signals it to access node, wherein signaling from the terminal to the access node comprises a special code point in a buffer status of the logical channel group containing the logical channel carrying the quality of service flow, wherein the special code point is made invalid/forbidden when the terminal is configured to signal a data rate boost and a data rate boost does not occur.

7. The apparatus according to claim 6, further comprising transmitting circuitry configured to transmit said request for establishing said data rate boost to a second access node in said mobile network forming a split bearer arrangement with said access node.

8. The apparatus according to claim 7, wherein said data rate boost is activated by transmitting said request to said second access node in said mobile network forming said split bearer arrangement with said access node.

9. An apparatus, comprising:

at least one processor;

at least one memory including computer program code; and at least one interface configured for communication with at least another apparatus, the at least one processor, with the at least one memory and the computer program code, being configured to cause the apparatus to perform:

receiving information from an access node in a mobile network providing access for said terminal, said information being indicative of that said terminal is allowed to request establishing a data rate boost with respect to an uplink flow of said terminal, deciding to request establishment of said data rate boost, and transmitting, to said access node, a request for establishing said data rate boost, wherein a packet data unit session corresponding to said uplink flow is not modified, wherein said request is transmitted as a valid code point in a buffer status of a logical channel group containing a logical channel carrying said uplink flow for which said data rate boost is requested, wherein said data rate boost is activated by relocating said uplink flow to a dedicated radio bearer providing higher data rate than a current dedicated radio bearer, wherein said request is indicative of a data rate boost timer upon an expiry of which said data rate boost is to be de-activated, wherein the timer for how long the data rate boost is assumed is part of a configuration of the terminal on a quality of service flow level, and when a data boost occurs for a quality of service flow, the terminal is configured to indicate the data rate boost and signals it to access node, wherein signaling from the terminal to the access node comprises a special code point in a buffer status of the logical channel group containing the logical channel carrying the quality of service flow, wherein the special code point is made invalid/forbidden when the terminal is configured to signal a data rate boost and a data rate boost does not occur.

10. The apparatus according to claim 9, wherein the at least one memory and the computer program code, with the at least one processor, being configured to cause the apparatus to further perform: transmitting said request for establishing said data rate boost to a second access node in said mobile network forming a split bearer arrangement with said access node.

11. The apparatus according to claim 10, wherein said data rate boost is activated by transmitting said request to said second access node in said mobile network forming said split bearer arrangement with said access node.

* * * * *